(12) United States Patent
Sengupta et al.

(10) Patent No.: US 7,638,049 B2
(45) Date of Patent: Dec. 29, 2009

(54) THREE-PORT HIGH PERFORMANCE MINI HOLLOW FIBER MEMBRANE CONTACTOR

(75) Inventors: Amitava Sengupta, Charlotte, NC (US); Linus I. Holstein, Salisbury, NC (US); E. Wayne Bouldin, Jr., Fort Mill, SC (US)

(73) Assignee: Celgard Inc., Charlotte, NC (US)

( * ) Notice: Subject to any disclaimer, the term of this patent is extended or adjusted under 35 U.S.C. 154(b) by 933 days.

(21) Appl. No.: 10/812,450

(22) Filed: Mar. 30, 2004

(65) Prior Publication Data

US 2005/0218064 A1    Oct. 6, 2005

(51) Int. Cl.
*B01D 63/02* (2006.01)
*B01D 61/00* (2006.01)

(52) U.S. Cl. .............. 210/321.88; 210/321.89; 210/321.79; 210/321.8; 96/8; 96/10

(58) Field of Classification Search .......... None
See application file for complete search history.

(56) References Cited

U.S. PATENT DOCUMENTS

| | | | |
|---|---|---|---|
| 3,228,877 A | 1/1966 | Mahon | |
| 3,422,008 A | 1/1969 | McLain | |
| 3,755,034 A | 8/1973 | Mahon et al. | |
| 4,220,535 A | 9/1980 | Leonard | |
| 4,623,460 A | 11/1986 | Kuzumoto et al. | |
| 4,664,681 A | 5/1987 | Anazawa et al. | |
| 4,940,617 A | 7/1990 | Baurmeister | |
| 5,186,832 A | 2/1993 | Mancusi et al. | |
| 5,264,171 A | 11/1993 | Prasad et al. | |
| 5,284,584 A | 2/1994 | Huang et al. | |
| 5,352,361 A | 10/1994 | Prasad et al. | |
| 5,383,448 A | 1/1995 | Tkatchouk et al. | |
| 5,449,457 A | 9/1995 | Prasad | |
| 5,584,997 A | 12/1996 | Yagihashi et al. | |
| 6,158,721 A | 12/2000 | Katou et al. | |

(Continued)

FOREIGN PATENT DOCUMENTS

EP    0554567 A1    8/1993

(Continued)

*Primary Examiner*—Krishnan S Menon
(74) *Attorney, Agent, or Firm*—Hammer & Associates, P.C.

(57) ABSTRACT

The instant invention is a hollow fiber membrane contactor. The hollow fiber membrane contactor includes a cartridge, a shell, a first end cap, and a second end cap. The shell, which is adapted for enclosing the cartridge, has two ends and an opening. The cartridge further includes a perforated center tube, a hollow fiber fabric, a first tube sheet, a second tube sheet, and a plug. The perforated center tube has a first end and a second end, and the hollow fiber fabric surrounds the center tube. The hollow fiber fabric includes hollow fiber membranes, and each hollow fiber membrane has a lumen. A first tube sheet and a second tube sheet affixes said fabric to said center tube at each end of the center tube, and the plug is located at the first tube sheet. Hollow fiber lumens are open at the first tube sheet and hollow fiber lumens are closed at the second tube sheet. The first end cap and the first tube sheet define a first headspace therebetween. The first end cap has an opening therethrough, which is in communication with hollow fiber lumens via said first headspace. The second end cap has an opening, and it is in communication with the center tube.

20 Claims, 4 Drawing Sheets

U.S. PATENT DOCUMENTS

| | | |
|---|---|---|
| 6,207,053 B1 | 3/2001 | Carroll et al. |
| 6,616,841 B2 * | 9/2003 | Cho et al. ............... 210/321.83 |
| 2002/0168491 A1 | 11/2002 | Runkle et al. |
| 2003/0009942 A1 | 1/2003 | Amendola |
| 2003/0154856 A1 | 8/2003 | Anderson |

FOREIGN PATENT DOCUMENTS

| | | |
|---|---|---|
| EP | 0873779 A2 | 10/1998 |
| EP | 1374974 A2 | 1/2004 |
| JP | A07088304 | 4/1995 |
| JP | 11047561 | 2/1999 |

* cited by examiner

THREE-PORT HIGH PERFORMANCE MINI HOLLOW FIBER MEMBRANE CONTACTOR

FIELD OF INVENTION

The instant invention relates to a three-port high performance mini hollow fiber membrane contactor.

BACKGROUND OF THE INVENTION

Liquids, as used in some industries, are required to be ultrapure. These ultrapure liquids are free or substantially free from: minerals, ions, and gas. The removal of minerals and ions is most often accomplished through a reverse osmosis process. The reverse osmosis process, however, does not remove the dissolved or entrained gases. The most common dissolved or entrained gas is air, which has as its major components nitrogen, oxygen, and carbon dioxide.

In the past, membrane contactors, for example, hollow fiber membrane contactors have been used to remove or add dissolved or entrained gases from or to a fluid. Hollow fiber membrane contactors are known. For example, see U.S. Pat. Nos. 3,288,877; 3,755,034; 4,220,535; 4,664,681; 4,940,617; 5,186,832; 5,264,171; 5,284,584; 5,352,361; and 5,449,457. Hollow fiber membrane contactors are commercially available under the name of LIQUI-CEL® from Membrana a division of Celgard Inc. of Charlotte, N.C. and under the name of SEPAREL® from Dainippon Ink and Chemicals of Tokyo, Japan. Some contactors are assembled from several pieces that are sealed with a plurality of O-rings, and then, they are mechanically fastened (e.g. clamped) together. Such contactors have numerous uses, one being the degassing of liquids.

To facilitate manufacture of these contactors, the hollow fiber membranes are typically formed into a fabric (e.g., woven or knitted). The fabric is wound around a mandrel (e.g., a perforated center tube) and fixed into place by potting the fabric edges, with either thermosetting or thermoplastic materials, to form a unitized structure. See, for example, U.S. Pat. Nos. 4,940,617 and 5,284,584. This unit can then be inserted within a shell (housing) and sealed, i.e., with or without O-rings, to make a membrane contactor. See, for example, U.S. Pat. No. 6,207,053.

Most hollow fiber membrane contactors with small diameters are made by integrally potting the unit inside the housing. This eliminates the need to provide or maintain any additional seal therebetween the unit and the housing via other means, i.e. O-rings, or gaskets. However, the contactor components (e.g., shell, end cap, center tube, microporous membranes and potting) are made from dissimilar materials that makes the joining a difficult problem. In addition, the demand for these contactors requires that improvements be investigated and utilized.

Accordingly, there is a need for an improved high performance mini hollow fiber membrane contactor.

SUMMARY OF THE INVENTION

The instant invention is a three-port high performance mini hollow fiber membrane contactor. The hollow fiber membrane contactor includes a cartridge, a shell, a first end cap, and a second end cap. The shell encloses the cartridge, and it has two ends and an opening. The cartridge further includes a perforated center tube, a hollow fiber fabric, a first tube sheet, a second tube sheet, and a plug. The perforated center tube has a first end and a second end, and the hollow fiber fabric surrounds the center tube. The hollow fiber fabric includes hollow fiber membranes, and each hollow fiber membrane has a lumen. A first tube sheet and a second tube sheet affixes said fabric to said center tube at each end of the center tube, and the plug is located at the first tube sheet. Hollow fiber lumens are open at the first tube sheet and hollow fiber lumens are closed at the second tube sheet. The first end cap and the first tube sheet define a first headspace therebetween. The first end cap has an opening therethrough, which is in communication with hollow fiber lumens via said first headspace. The second end cap has an opening, and it is in communication with the center tube.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
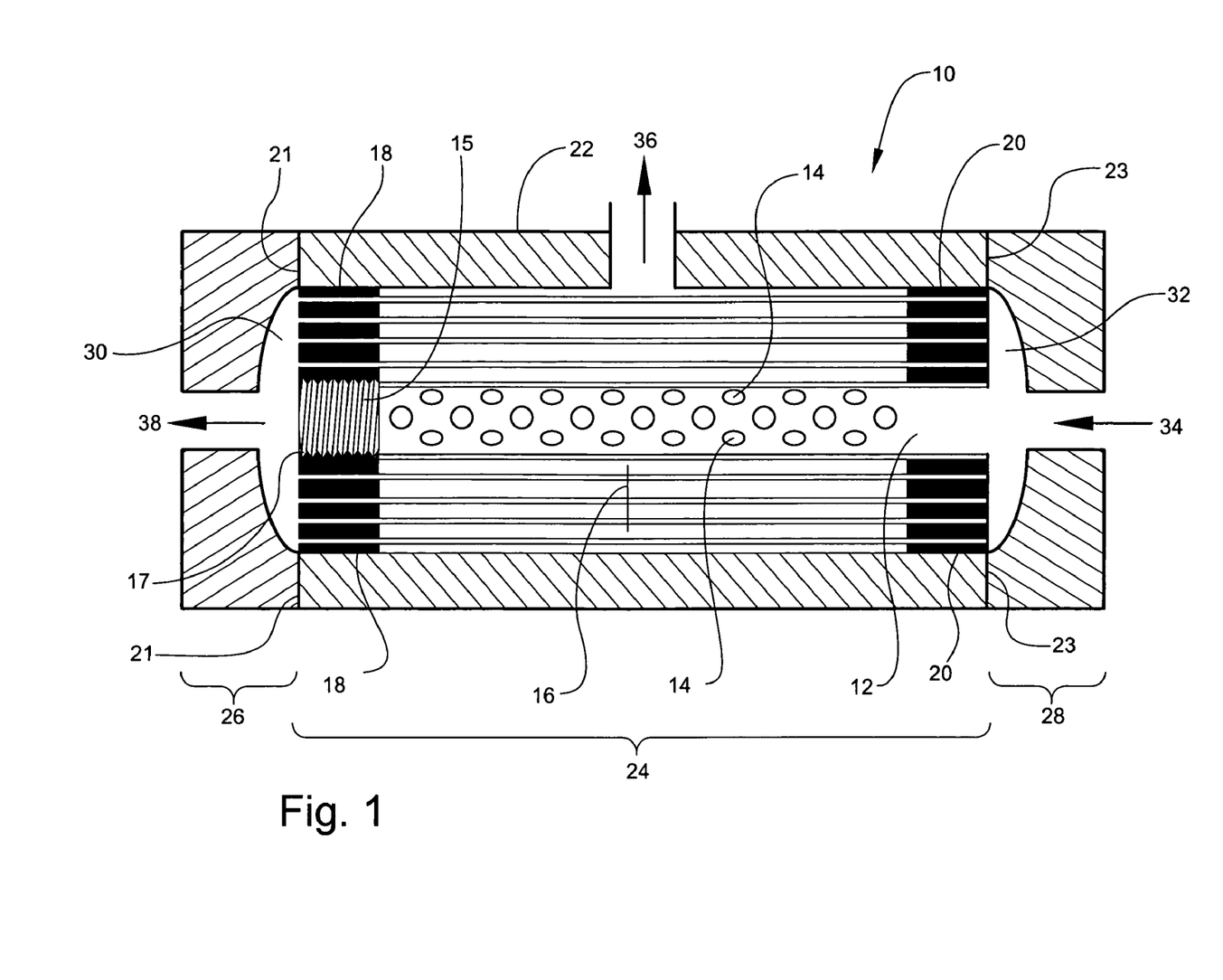
FIG. 1 is a schematic illustration of a hollow fiber membrane contactor according to the instant invention.
Figure 2:
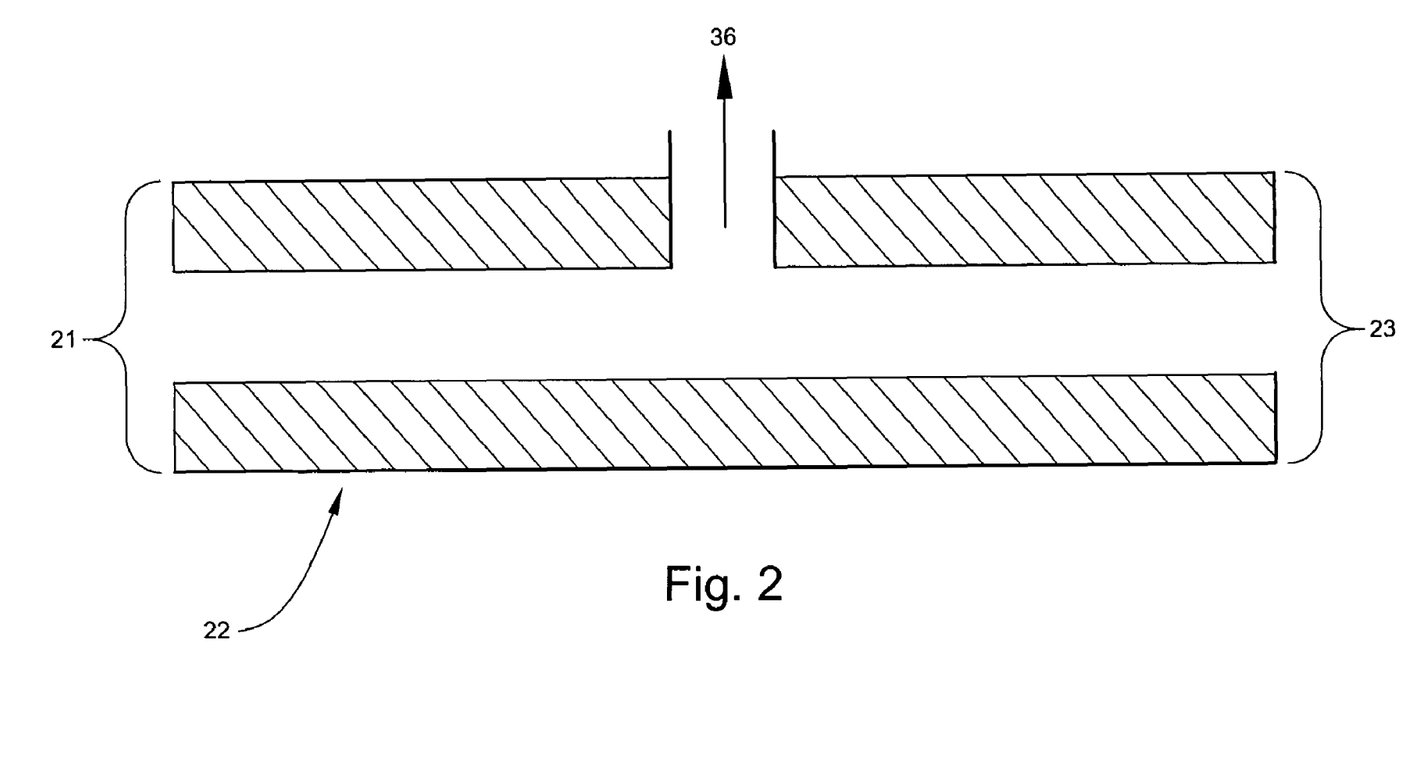
FIG. 2 is a longitudinal cross-sectional view of a shell.

Referring to the drawings wherein like numerals indicate like elements, there is shown in FIG. 1, a preferred embodiment of a hollow fiber membrane contactor 10 according to instant invention. Contactor 10 includes a shell 22, a cartridge 24, first end cap 26, and second end cap 28. Cartridge 24 includes a perforated center tube 12, a hollow fiber fabric 16, a first tube sheet 18, a second tube sheet 20, and a plug 15. Shell 22 encloses cartridge 24, and first end cap 26 and second end cap 28 are affixed to shell 22 at first shell end 21, and second shell end 23, respectively, as shown in FIG. 1 and FIG. 2.

In preferred operation, a liquid, for example laden with entrained gas, is introduced to hollow fiber contactor 10 via port 34, which is in fluid communication with center tube 12 via second headspace 32. The liquid exits center tube 12 via perforations 14, travels over the exterior surface of the hollow fiber membranes of the hollow fiber fabric 16, and exits contactor 10 via port 36. Port 38, which is in fluid communication with lumen side of hollow fibers of fabric 16 via first headspace 30, is coupled with a vacuum source. Therefore, when the gas-laden liquid travels over the exterior surface of the hollow fibers of fabric 16, vacuum drawn in the lumen side of the hollow fibers of fabric 16 provides the driving force for the diffusion of the gas from the liquid to the lumen side of the hollow fibers of fabric 16 where it is exhausted via port 38.

In another preferred operation, a liquid, for example laden with entrained gas is introduced, under elevated pressure, to hollow fiber contactor 10 via port 34, which is in fluid communication with center tube 12 via second headspace 32. The liquid, which is under elevated pressure, exits center tube 12 via perforations 14, travels over the exterior surface of the hollow fiber membranes of the hollow fiber fabric 16, and exits contactor 10 via port 36. Port 38 is in fluid communication with lumen side of hollow fibers of fabric 16 via first headspace 30, which is maintained at ambient pressure. Therefore, when the gas-laden liquid, under elevated pressure, travels over the exterior surface of the hollow fibers of fabric 16, the ambient pressure maintained in the lumen side of the hollow fibers of fabric 16 and the elevated pressure forced upon the exterior surface of the hollow fibers of fabric 16 provide the driving force for the diffusion of the gas from the liquid to the lumen side of the hollow fibers of fabric 16 where it is exhausted via port 38.

In another preferred operation, a liquid is introduced to hollow fiber contactor 10 via port 34, which is in fluid communication with center tube 12 via second headspace 32. The liquid exits center tube 12 via perforations 14, travels over the exterior surface of the hollow fiber membranes of the hollow fiber fabric 16, and exits contactor 10 via port 36. Simultaneously with the introduction of the liquid, a gas is introduced, under elevated pressure, into the lumen side of hollow fibers of fabric 16 via Port 38. Therefore, when the liquid travels over the exterior surface of the hollow fibers of fabric 16, the elevated gas pressure maintained in the lumen side of the hollow fibers of fabric 16 provides the driving force for the diffusion of the gas from the lumen side of the hollow fibers of fabric 16 into the liquid, which is exits the contactor 10 via Port 36.

Referring to FIG. 2, shell 22 has a port 36, described hereinbelow in detail, a first shell end 21, and a second shell end 23. Shell 22 may be made of any material, and preferably, shell 22 is made of polyethylene. Shell 22 may have any shape. Such shapes may be selected from the group consisting of a cylindrical shape, a rectangular shape, and combinations thereof. Shell 22 may or may not have flanged ends on either side. Shell 22 may have any diameter. Preferably, shell 22 has a diameter of 4 inches or less. Shell 22 may have any length, and preferably, shell 22 has a length of 24 inches or less.

Figure 3:
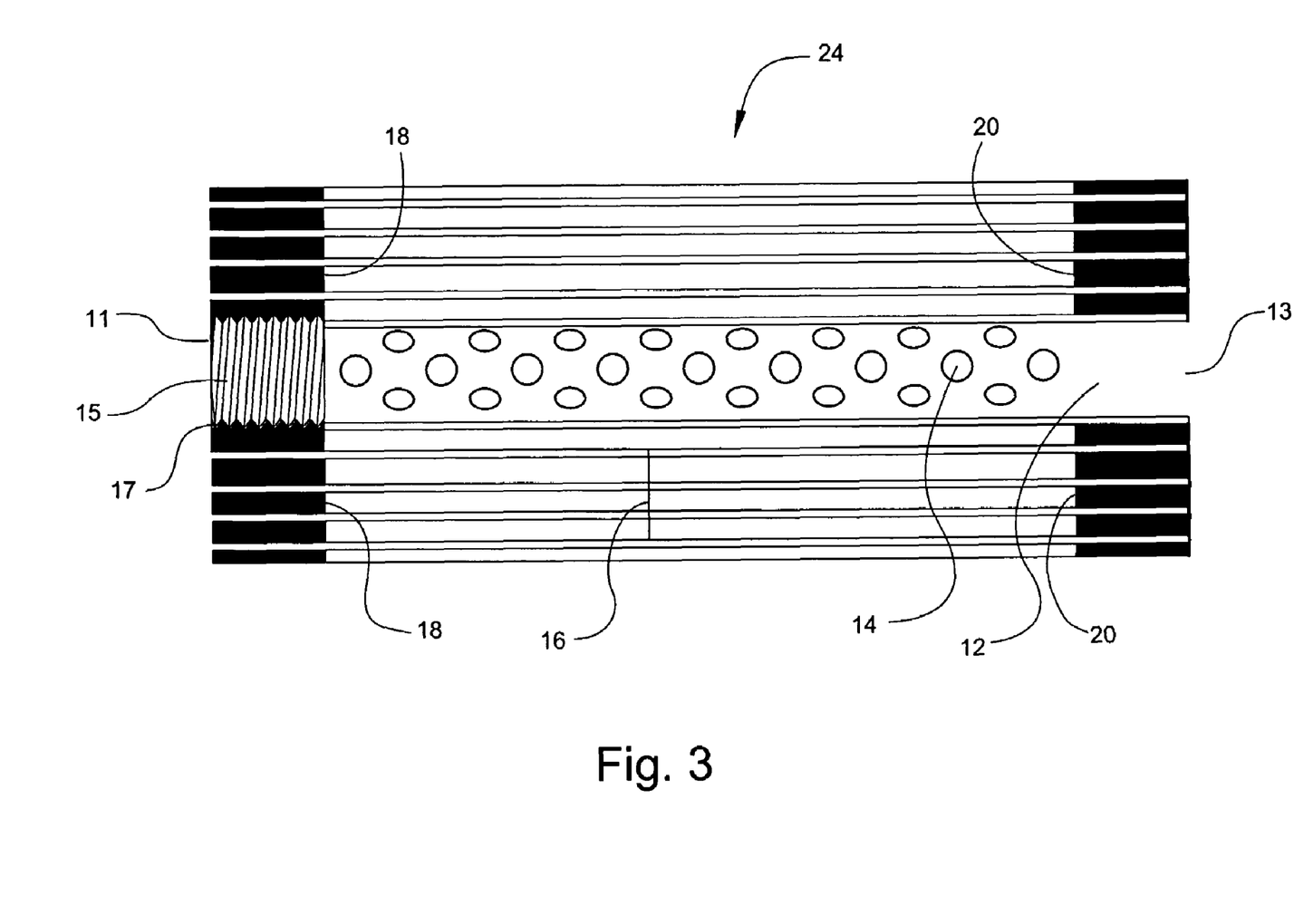
FIG. 3 is a longitudinal cross-sectional view of a cartridge.

Referring to FIG. 3, cartridge 24 includes a perforated center tube 12, a hollow fiber fabric 16, a first tube sheet 18, a second tube sheet 20, and a plug 15.

Center tube 12 may be made of any material, which possesses sufficient mechanical strength to provide the desired support for the hollow fiber fabric 16, first tube sheet 18, and second tube sheet 20. Preferably, center tube 12 is made of polyethylene. Center tube 12 may include plurality of perforations 14, and a flow-diverting baffle. Center tube 12 may posses a channel, preferably, center tube 12 has a first tube end 11 and a second tube end 13, and most preferably, first tube end 11 is closed. The first tube end 11 may contain internal grooves 17.

Hollow fiber fabric 16 may be constructed using processes well known in the art. Generally, in hollow fiber fabric construction, the hollow fiber membranes are formed into a bundle with a suitable shape for hollow fiber fabric construction. Preferred bundle arrangements include parallel laying down of fibers or bias wrap laying down of fibers. The hollow fibers of hollow fiber fabric 16 are any membranes suitable for use in diffusion operations. See Kesting, R. E., *Synthetic Polymeric Membranes*, $2^{nd}$ ed., John Wiley & Sons, New York, N.Y., (1985), incorporated herein by reference.

The hollow fiber membranes may be made of synthetic polymers, cellulose, or synthetically modified cellulose. Synthetic polymers include, but are not limited to, polyethylene, polypropylene, polybutylene, poly(isobutylene), poly(methyl pentene), polysulfone, polyethersulfone, polyester, polyetherimide, polyacrylnitril, polyamide, polymethylmethacrylate (PMMA), ethylenevinyl alcohol, and fluorinated polyolefins. Preferably, the hollow fiber membranes are made of polyolefins. Examples include, but are not limited to, microporous polyolefin membranes, commercially available under the name of CELGARD® hollow fibers from Celgard Inc. of Charlotte, N.C. or membranes from Dainippon Ink and Chemicals of Tokyo, Japan, see U.S. Pat. No. 4,664,681 incorporated herein by reference.

Spacer may be used to maintain the space between the layers of the wound hollow fiber fabric 16, so that fluid may be evenly distributed over the entire surface of all the hollow fibers. This distribution is important to maximize removal efficiency of the contactor. See U.S. Pat. No. 4,940,617. Spacer may be made of any material, preferably, spacer is made of polyethylene.

First tube sheet 18 is located at one end of hollow fiber fabric 16 near the first tube end 11 while second tube sheet 20 is located at the other end of hollow fabric 16 near the second tube end 13. Preferably, first tube sheet 18 and second tube sheet 20 are cylindrical in longitudinal cross section with sufficient thickness to provide support for the hollow fiber fabric 16 and to withstand the pressure exerted on them during operation. First tube sheet 18 and second tube sheet 20 function to hold the hollow fiber fabric 16 in place, and to partition the contactor 10 into a shell side passageway and a lumen side passageway. First tube sheet 18 and second tube sheet 20 may be comprised of an integral potting material. Integral potting material may be any material. Preferably, integral potting material is polyethylene.

Plug 15 functions to seal off first tube end 11. Plug 15 may be made of any material; preferably, plug 15 is made of polyethylene. Plug 15 may be any shape; preferably, plug 15 may be cylindrical in longitudinal cross section with sufficient thickness to withstand the pressure exerted on it during operation. Plug 15 may have grooves, which are complimentary to the grooves 17, to secure plug 15 to center tube 12. In the alternative, plug 15 may be an integral component of center tube 12, or it may be an integral component of first tube sheet 18.

In operation, referring to FIGS. 1, 2, 3, and 4, hollow fiber fabric 16 is wrapped around center tube 12, and simultaneously, a sufficient amount of external potting material, i.e. polyethylene, is laid at the lateral edges of fabric 16 to secure fabric 16 to center tube 12, and thereby forming a fabric-tube assembly. This fabric-tube assembly is, then, placed within shell 22, and an integral potting material is applied to the lateral ends of the fabric-tube assembly to form first tube sheet 18 and second tube sheet 20 thereby forming cartridge 24, and simultaneously forming a seal therebetween cartridge 24 and shell 22; thus forming a cartridge-shell assembly 25.

External potting materials may be thermosetting materials or thermoplastic materials. Thermosetting materials include, but are not limited to, epoxy, and polyurethane. Epoxies are preferred. Thermoplastics, as used herein, refers to a high polymer that softens when exposed to heat and returns to its original condition when cooled to room temperature; the term is usually applied to synthetics such as polyvinyl chloride, nylons, fluorocarbon polymers, polyethylene, polyurethane prepolymer, polystyrene, polypropylene, and cellulosic and acrylic resins. Exemplary thermoplastics include polyolefins, such as polypropylene and polyethylene. Preferably, external potting materials are polyethylene.

Different potting methods may be employed to complete the external potting step. Preferably, the external potting step is achieved via bead potting.

In bead potting, as described in the U.S. Patent Application Publication 2003/0009942 A1, which is incorporated herein by reference, simultaneously with winding of the hollow fiber fabric 16 around center tube 12, sufficient amount of external potting materials are laid at the lateral edges of hollow fiber fabric 16 to secure hollow fiber fabric 16 to center tube 12, and thereby forming a fabric-tube-assembly.

Integral potting materials may be thermosetting materials or thermoplastic materials, as described hereinabove. Integral potting materials may be the same material as the first potting material, as described hereinabove. Preferably, integral potting materials are polyethylene.

Different potting methods may be employed to complete the integral potting step. Different potting methods, as described hereinafter, include, but are not limited to, centrifugal potting, mold potting, and gravity potting.

In centrifugal potting, the fabric-tube-assembly is inserted into shell 22, the assembly is then spun on its midpoint to create centrifugal force at both ends of the fabric-tube-assembly, integral potting material are introduced into the shell-side space near both ends of the fabric-tube-assembly, and the integral potting material is allowed to cure.

In gravity potting, the integral potting material is introduced into each end of the vertically mounted fabric-tube-assembly, one at a time, and allowed to settle into the end of the fabric-tube-assembly and cure.

In mold potting, the fabric-tube-assembly is placed in a mold, and the mold is filled with the integral potting material to a desired depth. The fabric-tube-assembly is retained in filled mold until integral potting material hardens.

Figure 4:
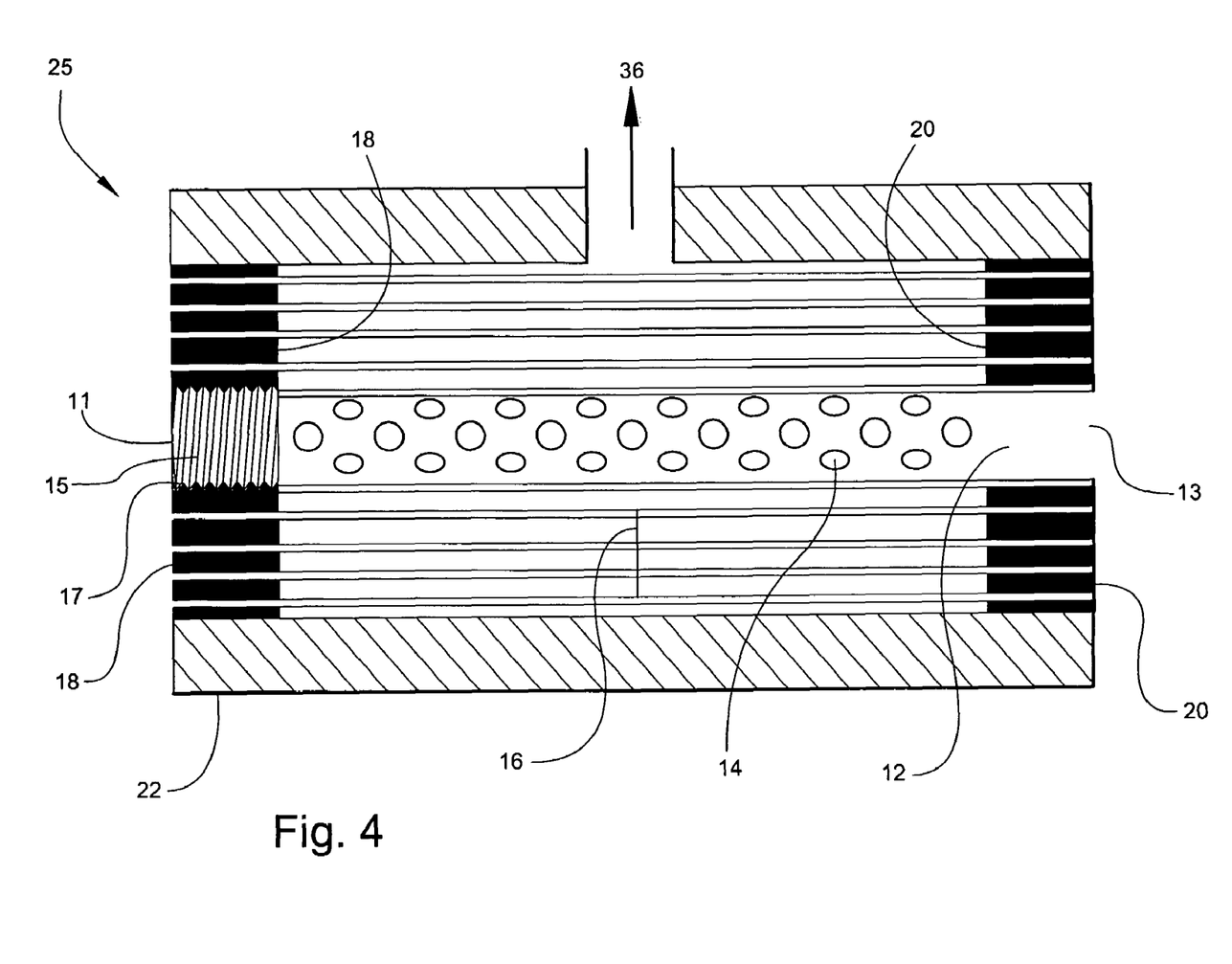
FIG. 4 is a longitudinal cross-sectional view of a cartridge-shell assembly.

End caps 26 and 28 are adjoined to cartridge-shell assembly 25 to form contactor (10). End caps 26 and 28 may be made of any material; preferably, end caps 26 and 28 are made of polyethylene. The adjoining of the end caps 26 and 28 to the shell ends (21 and 23) can be achieved by various techniques such as heat welding technique, heat fusion technique, solvent welding technique, ultrasonic welding technique, and infrared welding technique.

Membrane contactor 10, may have any number of ports, preferably, contactor 10 has three ports: port 34, port 36, and port 38. As will be readily apparent to those of ordinary skill, placement of ports may vary, so long as the integrity of the shell side passageway and the lumen side passageway according to instant invention is maintained.

Port 34 is a feed inlet means; it is generally a port, nozzle, fitting or other opening which allows introduction of fluid mixtures, which are to be separated, into a hollow fiber membrane contactor.

Port 36 is a non-permeate outlet means, which is adapted for removing the fluids, which do not permeate through the hollow fiber membranes. Port 36 is generally a port, nozzle, fitting, or other opening, which allows the removal of the non-permeate from the hollow fiber membrane contactor.

Port 38 may be a permeate outlet means for removing fluid, which permeate through the hollow fiber membrane, or the means for introducing fluid at elevated pressure into the lumen side of hollow fiber fabric 16. Port 38 is generally a port, nozzle, fitting, or other opening adapted for withdrawing the permeate or introducing a fluid.

The present invention may be embodied in other forms without departing from the spirit and the essential attributes thereof, and, accordingly, reference should be made to the appended claims, rather than to the foregoing specification, as indicated the scope of the invention.

We claim:

1. A hollow fiber membrane contactor comprising:
   a cartridge;
   said cartridge comprising:
      a perforated center tube having a first end and a second end;
      a hollow fiber fabric comprising hollow fiber membranes, each said hollow fiber membrane having a lumen, said hollow fiber fabric surrounding said center tube;
      a first tube sheet and a second tube sheet affixing said fabric to said center tube at each of said center tube ends;
      a plug located at said first tube sheet; and
      said fiber lumens being open at said first tube sheet and said fiber lumens being closed at said second tube sheet;
   a shell having two ends and an opening, said shell being adapted to enclose said cartridge;
   said tube sheets being sealed to said shell;
   a first end cap having an opening therethrough;
   said first end cap being adjoined to said first end of said shell where said first end cap and said first tube sheet defining a first head space therebetween;
   said first end cap opening being in communication with said hollow fiber lumens via said first head space;
   a second end cap having an opening therethrough;
   said second end cap being adjoined to said second end of said shell where said second end cap and said second tube sheet defining a second head space therebetween;
   said second end cap opening being in communication with said center tube via said second head space;
   wherein fluid being introduced into said contactor via said second end cap opening, said fluid being distributed across said hollow fiber fabric, said fluid then exiting said contactor via said shell opening, and a vacuum being applied via said first end cap opening;
   wherein said shell, said first end cap, said second end cap, said center tube, said first tube sheet, said second tube sheet, and said plug are made from a same material.

2. The hollow fiber membrane contactor according to claim 1, wherein said same material being polyethylene.

3. The hollow fiber membrane contactor according to claim 1, wherein said shell having a diameter of 4 inches (10 cm) or less.

4. The hollow fiber membrane contactor according to claim 1, wherein said shell having a length of 24 inches (60 cm) or less.

5. The hollow fiber membrane contactor according to claim 1, said contactor further comprising a baffle.

6. A system for degassing a liquid comprising:
   a liquid under an elevated pressure;
   a hollow fiber membrane contactor comprising;
      a cartridge;
      said cartridge comprising:
         a perforated center tube having a first end and a second end;
         a hollow fiber fabric comprising hollow fiber membranes, each said hollow fiber membrane having a lumen, said hollow fiber fabric surrounding said center tube;
         a first tube sheet and a second tube sheet affixing said fabric to said center tube at each of said center tube ends;
         a plug located at said first tube sheet; and
         said fiber lumens being open at said first tube sheet and said fiber lumens being closed at said second tube sheet;
      a shell having two ends and an opening, said shell being adapted to enclose said cartridge;
      said tube sheets being sealed to said shell;
      a first end cap having an opening therethrough;
      said first end cap being adjoined to said first end of said shell where said first end cap and said first tube sheet defining a first head space therebetween;
      said first end cap opening being in communication with said hollow fiber lumens via said first head space;
      a second end cap having an opening therethrough;

said second end cap being adjoined to said second end of said shell where said second end cap and said second tube sheet defining a second head space therebetween;

said second end cap opening being in communication with said center tube via said second head space;

wherein said fluid under the elevated pressure being introduced to said contactor via said second end cap opening, said fluid under the elevated pressure being distributed across said hollow fiber fabric, said fluid then exiting said contactor via said shell opening;

wherein said shell, said first end cap, said second end cap, said center tube, said first tube sheet, said second tube sheet, and said plug are made from a same material.

7. A hollow fiber membrane contactor comprising:
a cartridge;
said cartridge comprising:
 a perforated center tube having two ends;
 a hollow fiber fabric surrounding said tube, said hollow fiber fabric comprising hollow fiber membranes, said hollow fiber membranes having a lumen;
 tube sheets affixing said fabric to said tube at each said tube end; and
 a plug located at one end of said tube;
 wherein hollow fiber lumens being open at the tube sheet next to said plug and hollow fiber lumens being closed at the other tube sheet;
a shell having two ends and an opening, said shell being adapted to enclose said cartridge;
said tube sheets being sealed to said shell;
end caps having an opening therethrough;
said end caps being adjoined to said shell ends;
wherein one of said end caps and said tube sheet next to said plug defining a first head space therebetween where said end cap opening being in communication with said hollow fiber lumens via said first head space;
wherein said other end cap and said other tube sheet defining a second head space therebetween where said end cap opening being in communication with said center tube via said second headspace;
wherein fluid introduced into said contactor via said opening in communication with said center tube being distributed across said hollow fiber fabric and exiting said contactor via said opening through said shell, and a vacuum being applied via said opening in communication with said hollow fiber lumens;
wherein said shell, said end caps, said center tube, said tube sheets, and said plug are made from a same material.

8. The hollow fiber membrane contactor according to claim 7, wherein said same material being polyethylene.

9. The hollow fiber membrane contactor according to claim 7, wherein said shell having a diameter of 4 inches (10 cm) or less.

10. The hollow fiber membrane contactor according to claim 7, wherein said shell having a length of 24 inches (60 cm) or less.

11. The hollow fiber membrane contactor according to claim 7, said contactor further comprising a baffle.

12. A system for introducing a gas into a liquid comprising:
a liquid;
a gas under an elevated pressure;
a hollow fiber membrane contactor comprising:
 a cartridge;
 said cartridge comprising:
  a perforated center tube having a first end and a second end;
  a hollow fiber fabric comprising hollow fiber membranes, each said hollow fiber membrane having a lumen, said hollow fiber fabric surrounding said center tube;
  a first tube sheet and a second tube sheet affixing said fabric to said center tube at each of said center tube ends;
  a plug located at said first tube sheet; and
  said fiber lumens being open at said first tube sheet and said fiber lumens being closed at said second tube sheet;
 a shell having two ends and an opening, said shell being adapted to enclose said cartridge;
 said tube sheets being sealed to said shell;
 a first end cap having an opening therethrough;
 said first end cap being adjoined to said first end of said shell where said first end cap and said first tube sheet defining a first head space therebetween;
 said first end cap opening being in communication with said hollow fiber lumens via said first head space;
 a second end cap having an opening therethrough;
 said second end cap being adjoined to said second end of said shell where said second end cap and said second tube sheet defining a second head space therebetween;
 said second end cap opening being in communication with said center tube via said second head space;
 wherein said gas under the elevated pressure being introduced into said hollow fiber lumens via said first end cap opening, and simultaneously said fluid being introduced to said contactor via said second end cap opening, said fluid being distributed across said hollow fiber fabric, said fluid then exiting said contactor via said shell opening;
 wherein said shell, said first end cap, said second end cap, said center tube, said first tube sheet, said second tube sheet, and said plug are made from a same material.

13. The hollow fiber membrane contactor according to claim 1 wherein said shell opening being located at a midpoint between said two ends of said shell.

14. The system for degassing a liquid according to claim 6 wherein said shell opening being located at a midpoint between said two ends of said shell.

15. The hollow fiber membrane contactor according to claim 7 wherein said shell opening being located at a midpoint between said two ends of said shell.

16. The system for degassing a liquid according to claim 12 wherein said shell opening being located at a midpoint between said two ends of said shell.

17. A hollow fiber membrane contactor comprising:
a cartridge;
said cartridge comprising:
 a perforated center tube having a first end and a second end;
 a hollow fiber fabric comprising hollow fiber membranes, each said hollow fiber membrane having a lumen, said hollow fiber fabric surrounding said center tube;
 a first tube sheet and a second tube sheet affixing said fabric to said center tube at each of said center tube ends;
 a plug located at said first tube sheet; and
 said fiber lumens being open at said first tube sheet and said fiber lumens being closed at said second tube sheet;
a shell having two ends and an opening, said shell being adapted to enclose said cartridge;

said tube sheets being sealed to said shell;
a first end cap having an opening therethrough;
said first end cap being adjoined to said first end of said shell where said first end cap and said first tube sheet defining a first head space therebetween;
said first end cap opening being in communication with said hollow fiber lumens via said first head space;
a second end cap having an opening therethrough;
said second end cap being adjoined to said second end of said shell where said second end cap and said second tube sheet defining a second head space therebetween;
said second end cap opening being in communication with said center tube via said second head space;
wherein fluid being introduced into said contactor via said second end cap opening, said fluid being distributed across said hollow fiber fabric, said fluid then exiting said contactor via said shell opening, and a vacuum being applied via said first cap end opening.

18. A system for degassing a liquid comprising:
a liquid under an elevated pressure;
a hollow fiber membrane contactor comprising;
  a cartridge;
  said cartridge comprising:
    a perforated center tube having a first end and a second end;
    a hollow fiber fabric comprising hollow fiber membranes, each said hollow fiber membrane having a lumen, said hollow fiber fabric surrounding said center tube;
    a first tube sheet and a second tube sheet affixing said fabric to said center tube at each of said center tube ends;
    a plug located at said first tube sheet; and
    said fiber lumens being open at said first tube sheet and said fiber lumens being closed at said second tube sheet;
  a shell having two ends and an opening, said shell being adapted to enclose said cartridge;
  said tube sheets being sealed to said shell;
  a first end cap having an opening therethrough;
  said first end cap being adjoined to said first end of said shell where said first end cap and said first tube sheet defining a first head space therebetween;
  said first end cap opening being in communication with said hollow fiber lumens via said first head space;
  a second end cap having an opening therethrough;
  said second end cap being adjoined to said second end of said shell where said second end cap and said second tube sheet defining a second head space therebetween;
  said second end cap opening being in communication with said center tube via said second head space;
wherein said fluid under the elevated pressure being introduced to said contactor via said second end cap opening, said fluid under the elevated pressure being distributed across said hollow fiber fabric, said fluid then exiting said contactor via said shell opening.

19. A hollow fiber membrane contactor comprising:
a cartridge;
said cartridge comprising:
  a perforated center tube having two ends;
  a hollow fiber fabric surrounding said tube, said hollow fiber fabric comprising hollow fiber membranes, said hollow fiber membranes having a lumen;
  tube sheets affixing said fabric to said tube at each said tube end; and
  a plug located at one end of said tube;
    wherein hollow fiber lumens being open at the tube sheet next to said plug and hollow fiber lumens being closed at the other tube sheet;
a shell having two ends and an opening, said shell being adapted to enclose said cartridge;
said tube sheets being sealed to said shell;
end caps having an opening therethrough;
said end caps being adjoined to said shell ends;
wherein one of said end caps and said tube sheet next to said plug defining a first head space therebetween where said end cap opening being in communication with said hollow fiber lumens via said first head space;
wherein said other end cap and said other tube sheet defining a second head space therebetween where said end cap opening being in communication with said center tube via said second headspace;
wherein fluid introduced into said contactor via said opening in communication with said center tube being distributed across said hollow fiber fabric and exiting said contactor via said opening through said shell, and a vacuum being applied via said opening in communication with said hollow fiber lumens.

20. A system for introducing a gas into a liquid comprising:
a liquid;
a gas under an elevated pressure;
a hollow fiber membrane contactor comprising;
  a cartridge;
  said cartridge comprising:
    a perforated center tube having a first end and a second end;
    a hollow fiber fabric comprising hollow fiber membranes, each said hollow fiber membrane having a lumen, said hollow fiber fabric surrounding said center tube;
    a first tube sheet and a second tube sheet affixing said fabric to said center tube at each of said center tube ends;
    a plug located at said first tube sheet; and
    said fiber lumens being open at said first tube sheet and said fiber lumens being closed at said second tube sheet;
  a shell having two ends and an opening, said shell being adapted to enclose said cartridge;
  said tube sheets being sealed to said shell;
  a first end cap having an opening therethrough;
  said first end cap being adjoined to said first end of said shell where said first end cap and said first tube sheet defining a first head space therebetween;
  said first end cap opening being in communication with said hollow fiber lumens via said first head space;
  a second end cap having an opening therethrough;
  said second end cap being adjoined to said second end of said shell where said second end cap and said second tube sheet defining a second head space therebetween;
  said second end cap opening being in communication with said center tube via said second head space;
wherein said gas under the elevated pressure being introduced into said hollow fiber lumens via said first end cap opening, and simultaneously said fluid being introduced to said contactor via said second end cap opening, said fluid being distributed across said hollow fiber fabric, said fluid then exiting said contactor via said shell opening.

* * * * *